US009647540B2

(12) United States Patent
Chen

(10) Patent No.: US 9,647,540 B2
(45) Date of Patent: May 9, 2017

(54) TIMING GENERATOR AND TIMING SIGNAL GENERATION METHOD FOR POWER CONVERTER

(71) Applicant: uPI Semiconductor Corp., Hsinchu County (TW)

(72) Inventor: Ya-Ping Chen, Hsinchu County (TW)

(73) Assignee: uPI Semiconductor Corp., Hsinchu County (TW)

( * ) Notice: Subject to any disclaimer, the term of this patent is extended or adjusted under 35 U.S.C. 154(b) by 327 days.

(21) Appl. No.: 14/251,661

(22) Filed: Apr. 14, 2014

(65) Prior Publication Data

US 2014/0340059 A1 Nov. 20, 2014

(30) Foreign Application Priority Data

May 16, 2013 (TW) .............................. 102117406 A

(51) Int. Cl.
*H02M 3/156* (2006.01)

(52) U.S. Cl.
CPC .... *H02M 3/156* (2013.01); *H02M 2003/1566* (2013.01)

(58) Field of Classification Search
CPC .......... H02M 3/156–3/158; H02M 2003/1566; H02M 3/1563; H02M 3/1584; H02M 3/1588; H02M 2001/0019; H02M 2001/0032; H02M 2001/0025; Y02B 70/1466
See application file for complete search history.

(56) References Cited

U.S. PATENT DOCUMENTS 7,453,246 B2 * 11/2008 Qiu ....................... H02M 3/156
323/282
8,063,617 B2 * 11/2011 Wang .................. H02M 3/1584
323/272

(Continued)

FOREIGN PATENT DOCUMENTS

CN 1750373 3/2006
CN 1885698 12/2006
(Continued)

OTHER PUBLICATIONS

"Office Action of Taiwan Counterpart Application", issued on Oct. 23, 2014, p. 1-p. 5, in which the listed references were cited.
(Continued)

*Primary Examiner* — Timothy J. Dole
*Assistant Examiner* — Shahzeb K Ahmad
(74) *Attorney, Agent, or Firm* — Jianq Chyun IP Office

(57) ABSTRACT

A timing generator and a timing signal generation method for a power converter are provided. The timing generator includes an adjusting circuit and a timing generation unit. The adjusting circuit receives an error signal related to an output voltage of the power converter. The adjusting circuit generates an adjusting signal according to the error signal and a delay circuit. The timing generation unit generates a timing signal according to the error signal, the adjusting signal and a control signal. A width of the timing signal is changed with the error signal and the adjusting signal. Accordingly, the timing generator adjusts On-time/Off-time in response to a transient response.

8 Claims, 8 Drawing Sheets

(56) References Cited

U.S. PATENT DOCUMENTS

| | | | |
|---|---|---|---|
| 8,148,967 B2 | 4/2012 | Xing et al. | |
| 8,174,250 B2 | 5/2012 | Wu et al. | |
| 2007/0013356 A1 | 1/2007 | Qiu et al. | |
| 2008/0030181 A1 | 2/2008 | Liu et al. | |
| 2010/0033153 A1* | 2/2010 | Xing | H02M 3/156 323/288 |
| 2011/0260703 A1* | 10/2011 | Laur | H02M 3/1563 323/271 |
| 2012/0038334 A1* | 2/2012 | Peng | H02M 3/1588 323/282 |
| 2012/0112721 A1* | 5/2012 | Wu | H02M 3/156 323/288 |
| 2013/0038236 A1 | 2/2013 | Mitarashi | |
| 2014/0292299 A1* | 10/2014 | Yang | H02M 3/1588 323/288 |

FOREIGN PATENT DOCUMENTS

| | | |
|---|---|---|
| CN | 101154892 | 4/2008 |
| CN | 101764514 | 6/2010 |
| CN | 101924469 | 12/2010 |
| CN | 102377342 | 3/2012 |
| CN | 103078498 | 5/2013 |
| JP | 2008072786 | 3/2008 |
| TW | 200539555 | 12/2005 |
| TW | 200921317 | 5/2009 |
| TW | 201025813 | 7/2010 |
| TW | 201315106 | 4/2013 |

OTHER PUBLICATIONS

"Office Action of China Counterpart Application", issued on Apr. 5, 2016, p. 1-p. 6, in which the listed references were cited.

* cited by examiner

TIMING GENERATOR AND TIMING SIGNAL GENERATION METHOD FOR POWER CONVERTER

CROSS-REFERENCE TO RELATED APPLICATION

This application claims the priority benefit of Taiwan application serial no. 102117406, filed on May 16, 2013. The entirety of the above-mentioned patent application is hereby incorporated by reference herein and made a part of this specification.

BACKGROUND OF THE INVENTION

Field of the Invention

The invention relates to a power regulating technology, and more particularly, to a timing generator and a timing generation method for a power converter.

Description of Related Art

A DC-DC power supply design nowadays usually adopts a constant on time (COT) architecture. FIG. 1 is a schematic diagram of the DC-DC conversion circuit utilizing a conventional constant on time architecture. A comparator 110 compares an error signal Err with a ramp signal RAMP to generate a compared signal CM. A timing control circuit 120 provides a pulse width modulation signal PWM according a constant on time mechanism and the compared signal CM, in which a width of an On-time Ton is related to an input voltage Vin and an output voltage Vout.

FIG. 2 is waveform schematic diagram of the power converter 100. Please refer to FIG. 1 and FIG. 2 together. The error signal Err and the ramp signal RAMP are utilized to determine when to output a turn-on time Ton signal, in which a size of the error signal Err is related to both a feedback signal Vfb and a reference voltage Vref. While outputting the turn-on time Ton signal, the timing control circuit 120 starts to calculate a turn-on time signal Xon, and the turn-on time Ton of each period in the turn-on time timing signal Xon is fixed. However, despite that a conventional pulse width modulation operation architecture may achieve a fixed frequency effect, when the output voltage Vout is changed with variation of a load current IL, the timing control circuit 120 is still providing the same energy with the fixed frequency within one period, which results in that a power converter 100 to exhibit a poor performance during a load transient period.

In addition, as similar to the power converter 100 of FIG. 1, the timing control circuit 120 may be changed to adopt an adjustable on time mechanism.

FIG. 3 is a waveform schematic diagram of a conventional adjustable on time mechanism. The conventional adjustable on time mechanism utilizes the error signal Err related to the output voltage as an upper boundary to end a counting signal Cton. During a load transient period, the On-time Ton of the pulse width modulation signal PWM may be changed with the error signal Err. In case when energy of the output voltage Vout is insufficient, the On-time Ton of the pulse width modulation signal PWM may extend continuously.

FIG. 4 is a schematic diagram of comparing waveforms in the conventional constant on time mechanism and the conventional adjustable on time mechanism. Waveforms of the output voltage Vout and the load current Iload in the constant on time mechanism are marked as 410 and 430, respectively. Waveforms of the output voltage Vout and the load current Iload in the adjustable on time mechanism are marked as 420 and 440, respectively, and an ideal waveform of the load current Iload is marked as 450. In view of waveforms comparison in FIG. 4, it can be know that a climbing speed of the load current (waveform 440) of the adjustable on time mechanism is faster than a climbing speed of the load current (waveform 430) of the constant on time mechanism. However, before a closed loop control in the adjustable on time mechanism is stabilized, the output voltage Vout (waveform 420) shows a constantly oscillating. Therefore, both of said conventional technologies cannot help to improve the oscillating problem of the output voltage Vout.

SUMMARY OF THE INVENTION

Accordingly, the invention is directed a timing generator and a timing signal generation method for a power converter, so as to solve the problem as mentioned in Description of Related Art.

The invention provides a timing generator for a power converter, and the timing generator includes an adjusting circuit and a timing generation unit. The adjusting circuit receives an error signal related to an output voltage of the power converter, and generates an adjusting signal according to the error signal and a delay circuit. The timing generation unit is coupled to the adjusting circuit, and generates a timing signal according to the error signal, the adjusting signal and a control signal. A width of the timing signal is changed with the error signal and the adjusting signal.

In an embodiment of the invention, the control signal is a comparison result of a first comparator of the power converter, and the first comparator receives the error signal and a ramp signal.

In an embodiment of the invention, the control signal is related to the ramp signal of the power converter.

In an embodiment of the invention, the delay circuit includes a resistor, a first capacitor and a first current source being coupled together at a common node, and the adjusting signal is generated at the common node.

In an embodiment of the invention, the adjusting circuit includes a first amplifier and the delay circuit, the first amplifier has a first terminal receiving the error signal, a second input terminal coupled to an output terminal of the first amplifier, and an output terminal coupled to the delay circuit.

In an embodiment of the invention, the delay circuit includes a resistor, a first capacitor and a first current source, in which the resistor has a terminal coupled to an output terminal of the first amplifier and a second input terminal of the first amplifier, and another terminal coupled to a common node together with the first capacitor and the first current source, and the adjusting signal is generated at the common node.

In an embodiment of the invention, a relation between the adjusting signal V1 and the error signal Err is expressed $$V1 = (Err - Vw)_{Delay},$$

wherein V1 is the adjusting signal, Err is the error signal, Vw is the preset voltage difference, and Delay refers to a preset time for the adjusting signal to delay the error signal.

In an embodiment of the invention, the timing generation unit that includes a second comparator and a control circuit, the second comparator receives the error signal and a first preset voltage so as to control the control circuit to generate the timing signal. The first preset voltage is related to the adjusting signal.

The invention further provides a timing signal generation method for a power converter, the timing signal generation method includes the steps of: receiving an error signal related to an output voltage of the power converter; generating an adjusting signal according to the error signal and a delay means; and generating a timing signal according to the error signal, the adjusting signal and a control signal. A width of the timing signal is changed with the error signal and the adjusting signal.

Based on above, the timing generator of the invention utilizes an error signal related to an output voltage of a power converter and a delay means to generate an adjusting signal. The timing generator generates a timing signal according to the error signal, the adjusting signal and a control signal. The timing signal is utilized to adjust a width of ON-time of a high side switch in an output stage, or to adjust a width of OFF-time of a high side switch in an output stage. During a load transient period, since the timing signal provided by the timing generator may effectively converge the output voltage, the output voltage may be stabilized and duration of oscillation can be reduced, so as to solve the problem as mentioned in Description of Related Art.

However, the above descriptions and the below embodiments are only used for explanation, and they do not limit the scope of the present invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
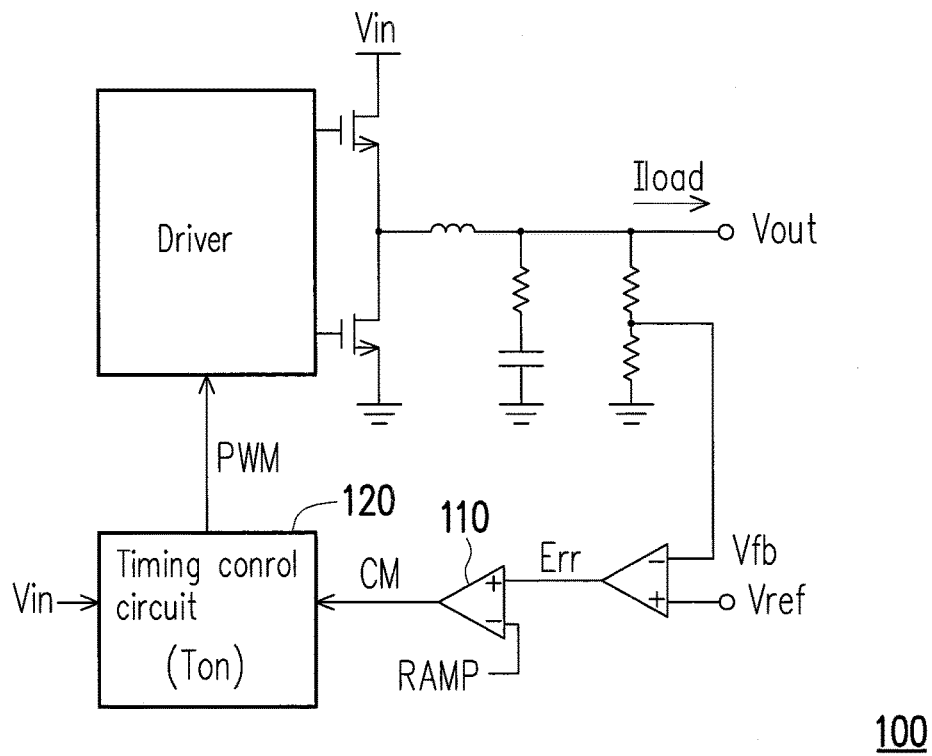
FIG. 1 is a schematic diagram of the DC-DC conversion circuit utilizing a conventional constant on time architecture.
Figure 2:
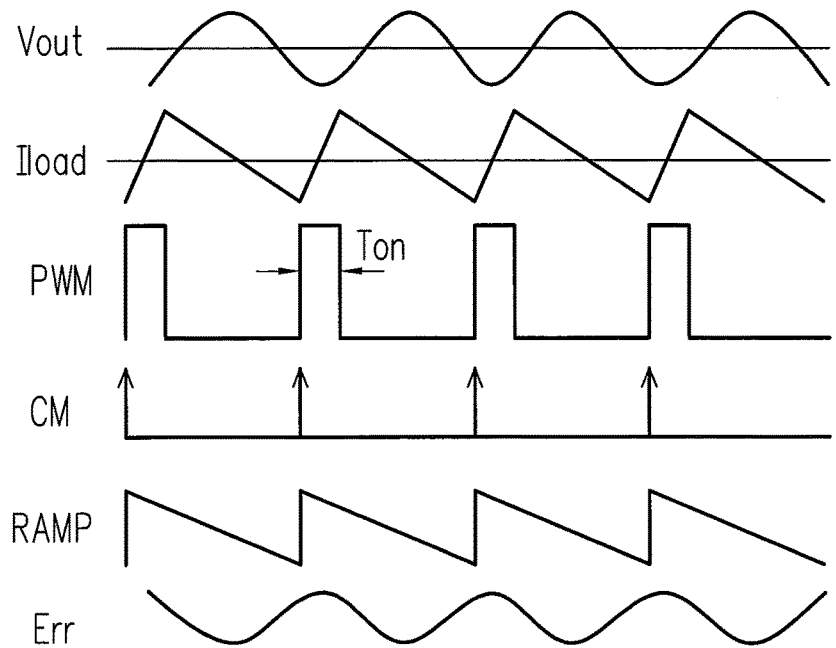
FIG. 2 is waveform schematic diagram of the power converter.
Figure 3:
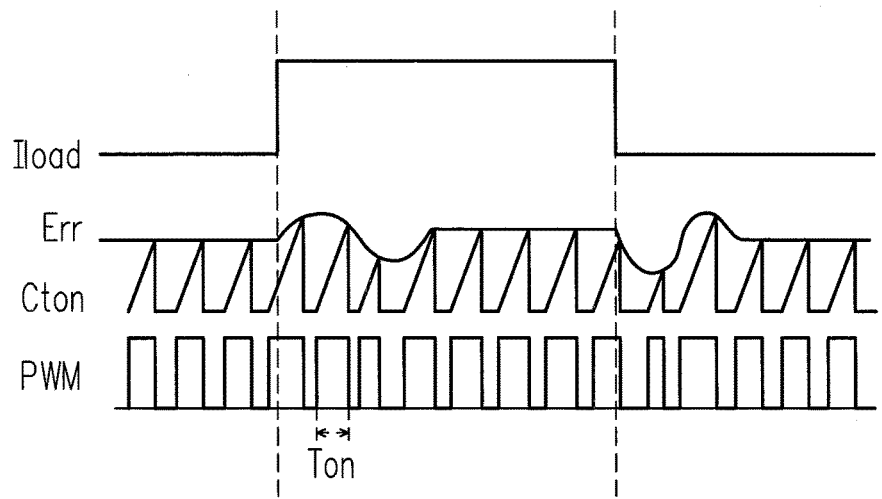
FIG. 3 is a waveform schematic diagram of a conventional adjustable on time mechanism.
Figure 4:
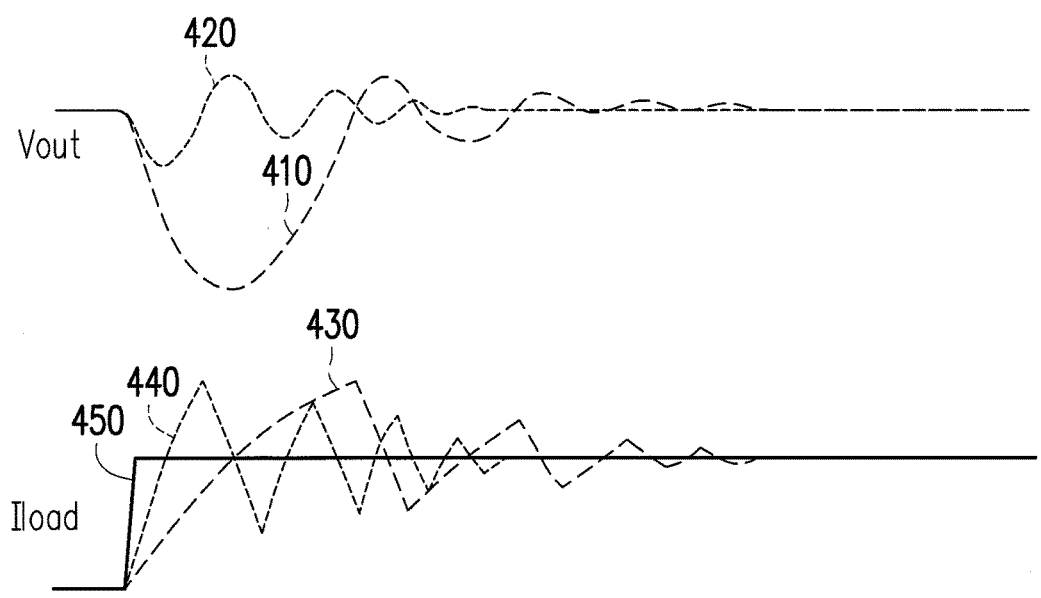
FIG. 4 is a schematic diagram of comparing waveforms in the conventional constant on time mechanism and the conventional adjustable on time mechanism.

Reference will now be made in detail to the exemplary embodiments of the invention, examples of which are illustrated in the accompanying drawings. Moreover, elements/components with same reference numerals represent same or similar parts in the drawings and embodiments.

In the following embodiments, when "A" device is referred to be "connected" or "coupled" to "B" device, the "A" device can be directly connected or coupled to the "B" device, or other devices probably exist there between. The term "circuit" represents at least one component or a plurality of components, or at least one component or a plurality of components actively and/or passively coupled to each other to provide suitable functions. The term "signal" represents at least one current, voltage, load, temperature, data or other signal.

Figure 5A:
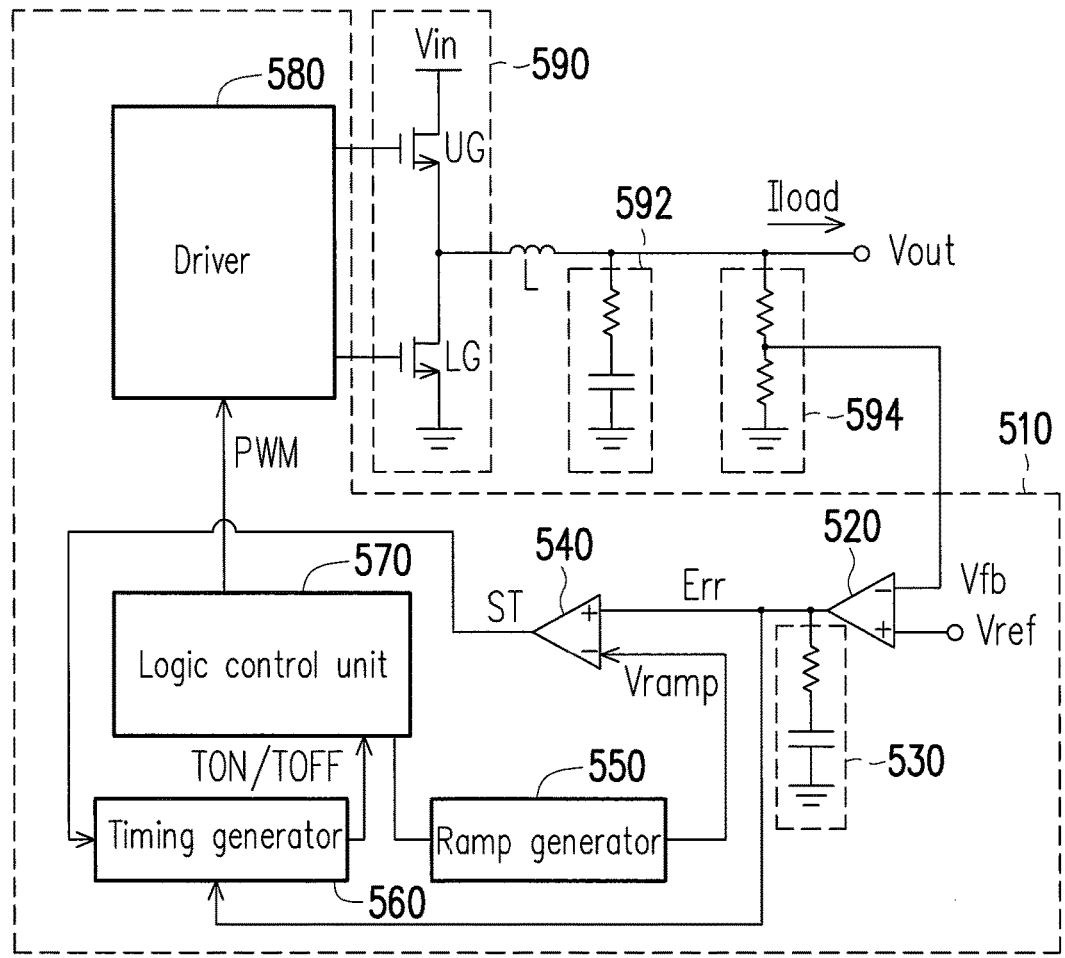
FIG. 5A is a schematic structure diagram of the power converter with the constant on time mechanism according to an embodiment of the invention.

FIG. 5A is a schematic structure diagram of the power converter with the constant on time (COT) mechanism according to an embodiment of the invention. Referring to FIG. 5A, a power converter 500 includes a DC-DC controller 510, an output stage 590, an inductor L, a regulator circuit 592 and a feedback circuit 594. In other embodiments, the output stage 590 is also known as a power stage.

The DC-DC controller 510 includes an amplifier 520, a compensating circuit 530, a comparator 540, a ramp generator 550, a timing generator 560, a logic control unit 570 and a driver 580. In the present embodiment, the amplifier 520 is, for example, a transconductance amplifier. In other embodiments, the amplifier 520 may be an error amplifier. A first input terminal of the amplifier 520 receives the feedback signal Vfb, and a second input terminal of the amplifier 520 receives the reference voltage Vref. The feedback signal Vfb is a proportional signal of the output voltage Vout. The amplifier 520 provides an error signal Err according to the reference voltage Vref and the feedback signal Vfb. The compensating circuit 530 is configured to compensate and stabilize the error signal Err. In the present embodiment, the ramp generator 550 is controlled by the logical control unit 570 and configured to generate a ramp signal Vramp. In other embodiments, the ramp generator 550 may not be controlled by the logical control unit 570. In addition, the ramp signal Vramp is also known as a ramp-like signal, a triangular wave signal or a sawtooth signal, which can be a repeat-declining slope or a repeat-inclining slope, which is determined according to an actual application.

The comparator 540 compares the ramp signal Vramp with the error signal Err to generate a control signal ST. The logic control unit 570 receives a timing signal TON (or TOFF) and generates a pulse width modulation signal PWM. The driver 580 drives the output stage 590 according to the pulse width modulation signal PWM, so as to control a high side switch UG and a low side switch LG. The output stage 590 is configured to perform a DC-DC conversion to the input voltage Vin, so that the power converter 500 may generate and output an output voltage Vout. In addition, when a load current Iload is transient, the output voltage Vout is then changed accordingly.

Figure 5B:
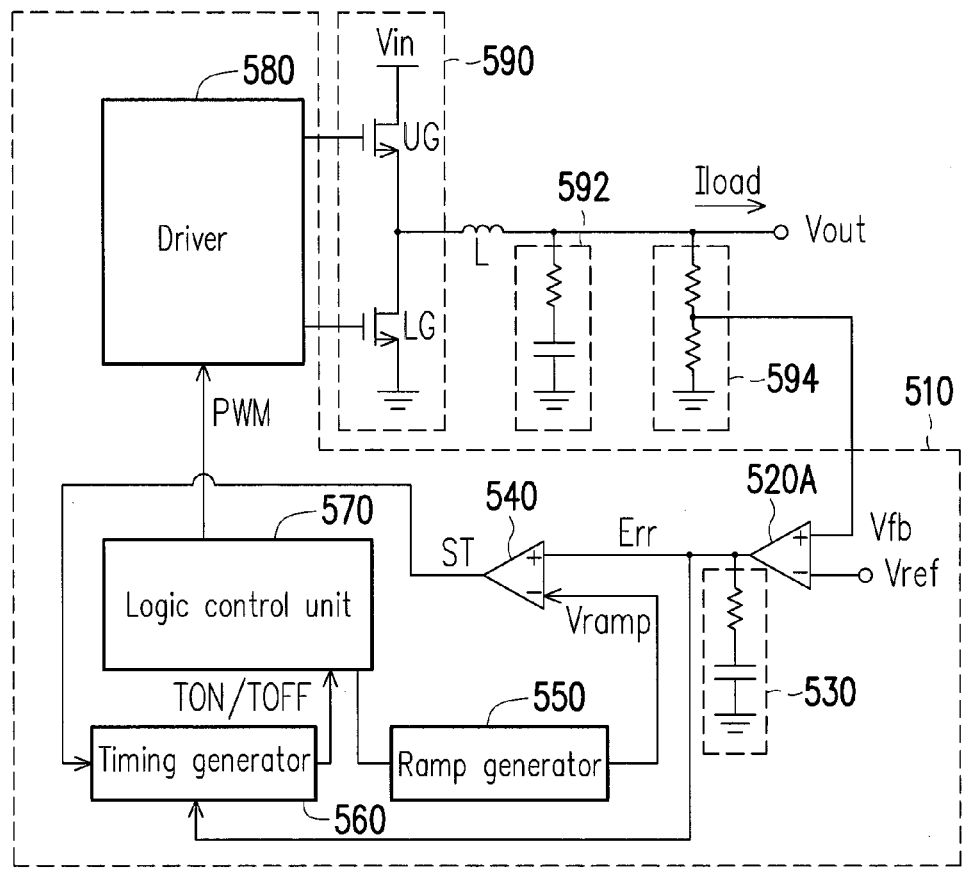
FIG. 5B is a schematic structure diagram of the power converter with a constant off time mechanism according to an embodiment of the invention.

FIG. 5B is a schematic structure diagram of the power converter with the constant off time mechanism according to an embodiment of the invention. Referring to FIG. 5B, circuit structure of a power converter 500A is similar to that of the power converter 500, thus detailed description to the same component thereof is omitted hereinafter. A difference between FIG. 5A and FIG. 5B is input methods of the amplifier 520 and an amplifier 520A. In FIG. 5B, a first input terminal of the amplifier 520A receives the feedback signal Vfb, and a second input terminal of the amplifier 520A receives the reference voltage Vref. Accordingly, in FIG. 5B, the error signal Err is in same phase of the output signal Vout; and in FIG. 5A, the error signal Err is in opposite phase of the output signal Vout.

Figure 6:
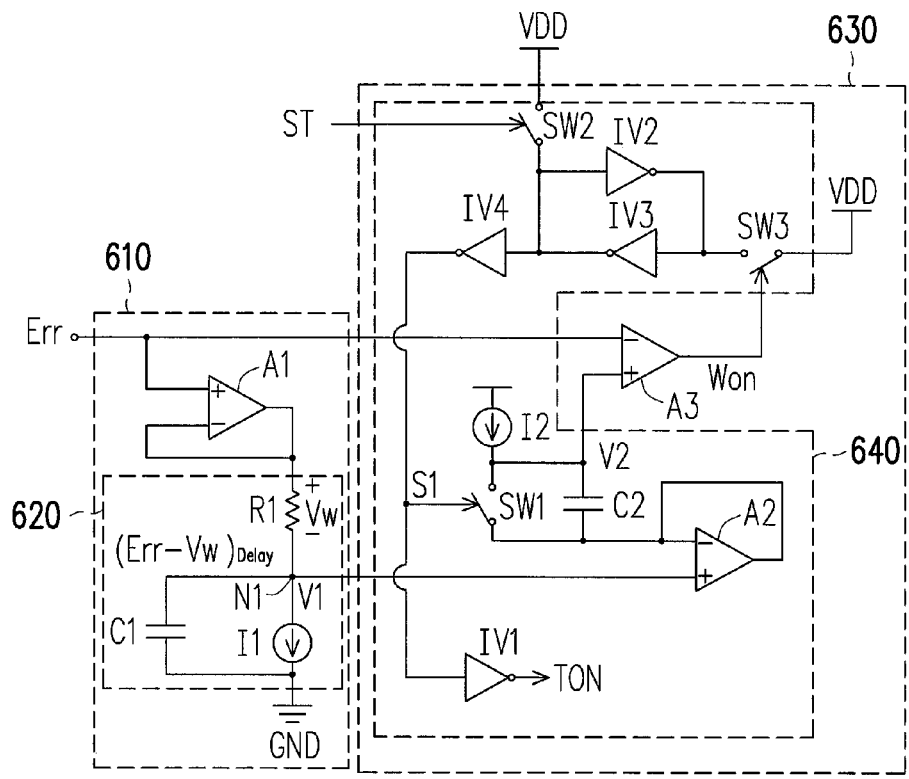
FIG. 6 is a schematic circuit diagram of the timing generator according to an embodiment of the invention.

FIG. 6 is a schematic circuit diagram of the timing generator 560 according to an embodiment of the invention. Please refer to FIG. 5A and FIG. 6 together. The timing generator 560 may regulate the output voltage Vout in the DC-DC controller 510. The timing generator 560 includes an adjusting circuit 610 and a timing generation unit 630. The adjusting circuit 610 includes a delay circuit 620. The timing generation unit 630 is coupled to the adjusting circuit 610.

In the present embodiment, the adjusting circuit 610 receives the error signal Err related to the output voltage Vout of the power converter 500, and generates an adjusting signal V1 according to the error signal Err and the delay circuit 620. The timing generation unit 630 generates the timing signal TON according to the error signal Err, the adjusting signal V1 and the control signal ST. A width of the timing signal TON is changed with the error signal Err and the adjusting signal V1. The control signal ST is related to the ramp signal Vramp of the power converter 500. Details regarding the timing generator 560 will be described more specifically later.

The control signal ST is a comparison result of the comparator 540 of the power converter 500. An input terminal of the comparator 540 receives the error signal Err, and another input terminal of the comparator 540 receives the ramp signal Vramp.

The adjusting circuit 610 includes an amplifier A1 and the delay circuit 620. The delay circuit 620 includes a first resistor R1, a first current source I1 and a first capacitor C1. The first resistor R1, the first current source I1 and the first capacitor C1 are coupled at a common node N1. An input terminal of the amplifier A1 is coupled to an output terminal of the amplifier A1, and another input terminal of the amplifier A1 is coupled to the error signal Err. A first terminal of the first resistor R1 is coupled to the output terminal of the amplifier A1. The first current source I1 is coupled between a second terminal of the first resistor R1 and a grounding terminal GND. The first capacitor C1 is coupled between a second terminal of the first resistor R1 and a grounding terminal GND. Accordingly, the adjusting signal V1 may be generated at the common node N1. The adjusting signal V1 is a result of the error signal Err minus a preset voltage difference Vw, and the first capacitor C1 is capable of delaying the adjusting signal V1. A relation between the adjusting signal V1 and the error signal Err is expressed as:

$$V1=(Err-I1\times R1)_{Delay}=(Err-Vw)_{Delay},$$

wherein V1 is the adjusting signal, Err is the error signal, Vw is the preset voltage difference, and Delay refers to a preset time for the adjusting signal to delay the error signal.

The timing generation unit 630 includes a comparator A3 and a control circuit 640. The comparator A3 has an input terminal that receives the error signal Err, and another input terminal that receives a first preset voltage V2. An output terminal of the comparator A3 generates a reset signal Won and configured to control a third switch SW3. The comparator A3 is configured to control the control circuit 640 to generate the timing signal TON. The first preset voltage V2 is related to the adjusting signal V1.

The control circuit 640 includes a second switch SW2, the third switch SW3, a first inverter IV1, a second inverter W2, a third inverter IV3, a fourth inverter IV4, an amplifier A2, a second capacitor C2, a second current source I2 and a first switch SW1.

In FIG. 5A, in case that ramp signal Vramp is the repeat-declining slope, when the error signal Err is greater than the ramp signal Vramp, the second switch SW2 is turned on and the first switch SW1 is turned off, and the second capacitor C2 starts charging from a voltage level locked by the first input terminal of the amplifier A2, in which a charging current is I2. A reference to voltage level of the second input terminal of the amplifier A2 is the adjusting signal V1.

When the first preset voltage V2 that determines On-time reaches a voltage value of the error signal Err, the reset signal Won turns on the third switch SW3 so that the fourth inverter P14 outputs a first signal S1 to turn on the first switch SW1 (that is, energy on the second capacitor C2 is released), and as a result, the first preset voltage V2 is suppressed at a delay voltage $(Err-Vw)_{Delay}$ (this delay voltage is equal to V1).

Figure 7:
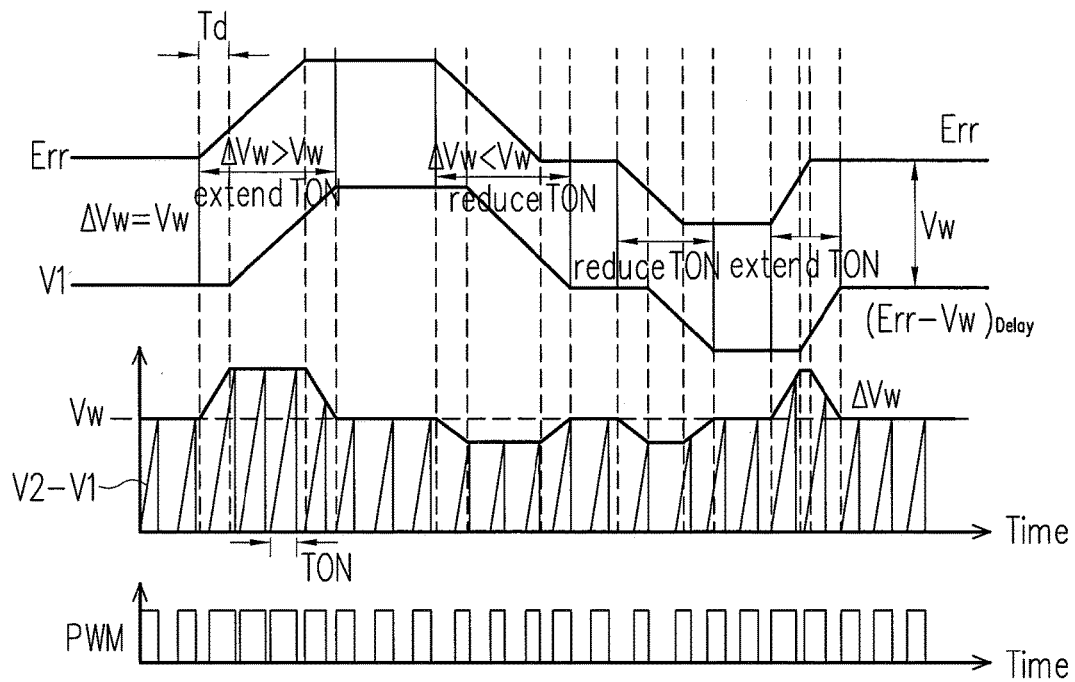
FIG. 7 is a waveform schematic diagram of the timing generator.

FIG. 7 is a waveform schematic diagram of the timing generator 560. Please refer to FIG. 6 and FIG. 7 together. Waveforms of the error signal Err and the adjusting signal V1 have a time difference Td on a time axis. The timing generation unit 630 generates the timing signal TON according a voltage difference interval $\{Err\ to\ (Err-Vw)_{Delay}\}$ formed according to the error signal Err, the adjusting signal V1 and the control signal ST. Since the error signal Err and the adjusting signal V1 has the time difference Td, the voltage difference interval $\{Err\ to\ (Err-Vw)_{Delay}\}$ may include a voltage difference $\Delta Vw=Err-(Err-Vw)_{Delay}$ and with three possible conditions: the voltage difference $\Delta Vw$ is equal to $Vw(Vw=I1\times R1)$; the voltage difference $\Delta Vw$ is greater than Vw; the voltage difference $\Delta Vw$ is less than Vw.

The timing signal TON is changed with variation of the output voltage Vout depicted in FIG. 5A. When the voltage difference $\Delta Vw$ is greater than Vw, the timing generation unit 630 extends On-time of the timing signal TON (i.e., it can be utilized to extend On-time of the high side switch of the output stage, or to reduce On-time of the low side switch of the output stage). When the voltage difference $\Delta Vw$ is less than Vw, the timing generation unit 630 reduces On-time of the timing signal TON (i.e., it can be utilized to reduce On-time of the high side switch of the output stage, or to extend On-time of the low side switch of the output stage).

The timing signal TON may be utilized to control On-time of the switches in the output stage. When the load current is transient, the timing signal TON may first increase a pulse width of the pulse width modulation signal PWM in response to changes of the output voltage, then timely reduces the pulse width once energy of the output voltage Vout becomes sufficient. Accordingly, the DC-DC controller may adaptively adjust the pulse width of the pulse width modulation signal PWM according to the timing signal TON, so as to adjust the output voltage.

Figure 8:
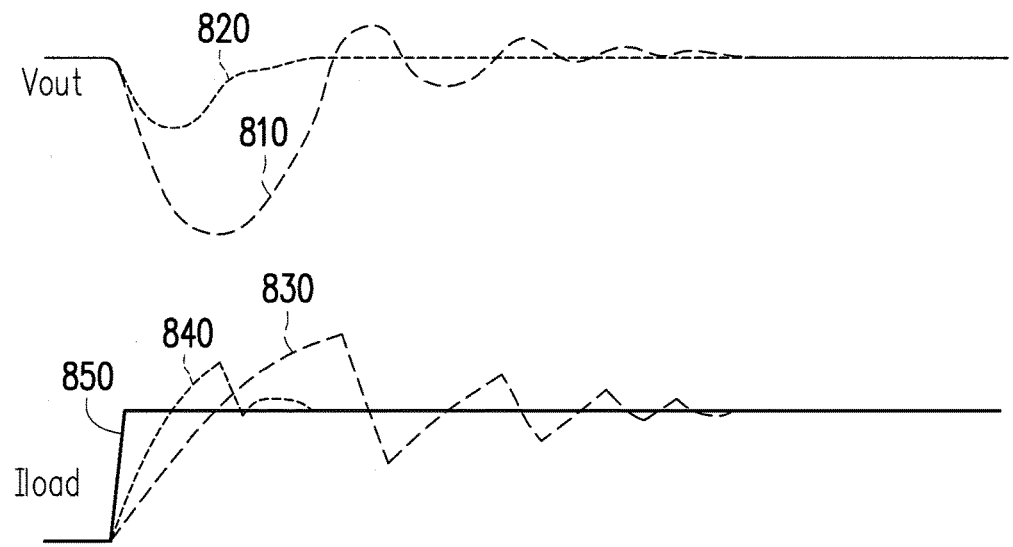
FIG. 8 is a schematic diagram of comparing waveforms in the conventional constant on time mechanism and the timing generator.

FIG. 8 is a schematic diagram of comparing waveforms in the conventional constant on time mechanism and the timing generator 560. Waveforms of the output voltage Vout and the load current Iload in the constant on time mechanism are marked as 810 and 830, respectively. In the present embodiment, waveforms of the output voltage Vout and the load current Iload in the adjustable on time mechanism are marked as 820 and 840, respectively, and an ideal waveform of the load current Iload is marked as 850. In view of waveforms comparison in FIG. 8, it can be know that a climbing speed of the load current (waveform 840) of the adjustable on time mechanism is faster than a climbing speed of the load current (waveform 830) of the constant on time mechanism. In addition, the output voltage Vout (waveform 820) of the present embodiment of the invention may be quickly converged, thus the output voltage Vout may be stabilized and duration of oscillation can be reduced.

Figure 9:
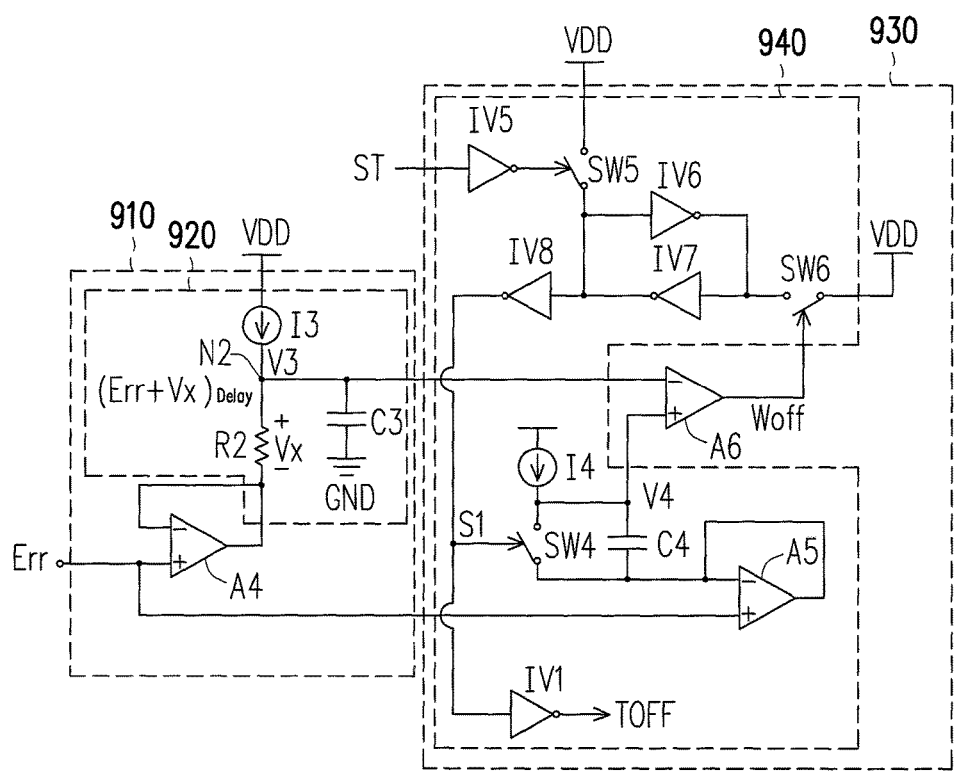
FIG. 9 is a schematic circuit diagram of the timing generator according to another embodiment of the invention.

FIG. 9 is a schematic circuit diagram of the timing generator 560A according to another embodiment of the invention, which is suitable for the constant off time mechanism. In addition, as similar to the circuit structure depicted in FIG. 6, the timing signal TOFF may be utilized to control On-time/Off-time of the high side switch or the low side switch in the output stage. The timing generator 560A may regulate the output voltage Vout in the power converter 500. The timing generator 560A includes an adjusting circuit 910 and a timing generation unit 930. The adjusting circuit 910 includes a delay circuit 920. The timing generation unit 930 is coupled to the adjusting circuit 910. Functions and operation in each of said circuits are similar to that in the first embodiment, only, the timing generation unit 930 generates the timing signal TOFF according to the error signal Err, an adjusting signal V3 and a control signal ST. A width of the timing signal TOFF is changed with the error signal Err and the adjusting signal V3.

In addition, a location where the delay circuit 920 is disposed is also different from that of the first embodiment. In the first embodiment, the delay circuit 620 is coupled between an inverse input terminal of the amplifier A1 and the grounding terminal, and the delay circuit 920 of the present embodiment is coupled between an amplifier A4 and an operating voltage VDD. Therefore, a relation between the adjusting signal V3 and the error signal Err is expressed as:

$$V3=(Err+I3\times R2)_{Delay}=(Err+Vx)_{Delay},$$

wherein V3 is the adjusting signal, Err is the error signal, Vx is the preset voltage difference, and Delay refers to a preset time for the adjusting signal to delay the error signal.

The timing generation unit 930 includes a comparator A6 and a control circuit 940. The control circuit 940 includes the first inverter IV1, a sixth inverter IV6, a seventh inverter IV7, a eighth inverter IV8, a fifth switch SW5, a sixth switch SW6, an amplifier A5, a fourth capacitor C4, a fourth current source I4 and a fourth switch SW4. The timing generation unit 930 may further include a fifth inverter IV5.

In FIG. 5A, in case that ramp signal Vramp is the repeat-inclining slope, when the error signal Err is greater than the ramp signal Vramp, the fifth switch SW5 is turned on and the fourth switch SW4 is turned off, and the fourth capacitor C4 starts charging from a voltage level locked by the inverse input terminal of the amplifier A5, in which a charging current is I4. A reference to voltage level of the inverse terminal of the comparator A6 is the adjusting signal V3.

When a second preset voltage V4 that determines On-time reaches a delay voltage $(Err+Vx)_{Delay}$ (this delay voltage is equal to V3), a reset signal Woff turns on the sixth switch SW6, so that sixth inverter IV6 outputs the first signal S1 to turn on the fourth switch SW4, (that is, energy on the second capacitor C4 is released), and as a result, the second preset voltage V4 is suppressed at the error signal Err.

Figure 10:
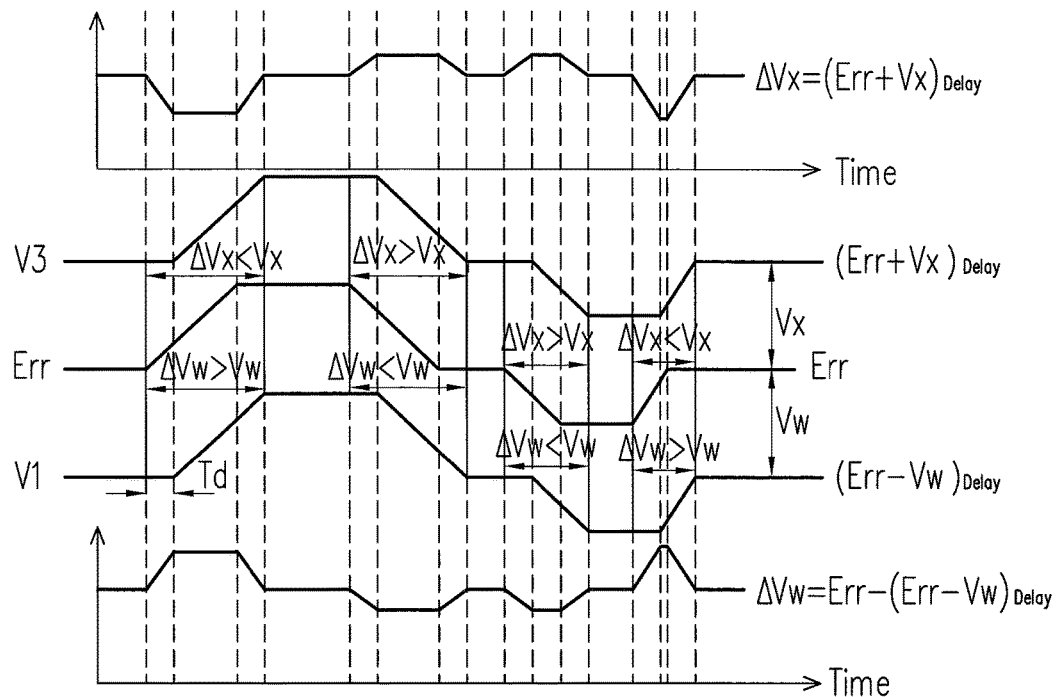
FIG. 10 is a waveform schematic diagram of a timing generator.

FIG. 10 is a waveform schematic diagram of a timing generator. Waveforms of the two timing generators 560 and 560A are illustrated in FIG. 10. Description regarding the waveform of the timing generator 560 may refer to the description of FIG. 7, thus it is omitted hereinafter. Please refer to FIG. 9 and FIG. 10 together. Waveforms of the error signal Err and the adjusting signal V3 have a time difference Td on a time axis. The timing generation unit 930 generates the timing signal TOFF according a voltage difference interval $\{(Err+Vx)_{Delay}$ to Err$\}$ formed according to the error signal Err, the adjusting signal V3 and the control signal ST.

Since the error signal Err and the adjusting signal V3 has the time difference Td, the voltage difference interval $\{(Err+Vx)_{Delay}$ to Err$\}$ may include a voltage difference $\Delta Vx=(Err+Vx)_{Delay}-Err$ and with three possible conditions: the voltage difference $\Delta Vx$ is equal to Vx (i.e., I3×R2); the voltage difference $\Delta Vx$ is greater than Vx; the voltage difference $\Delta Vx$ is less than Vx.

The timing signal TOFF is changed with variation of the output voltage Vout depicted in FIG. 5A. When the voltage difference $\Delta Vx$ is less than Vx, the timing generation unit 930 extends Off-time of the timing signal TOFF (i.e., it can be utilized to extend Off-time of the high side switch of the output stage, or to reduce Off-time of the low side switch of the output stage). In addition, when the voltage difference $\Delta Vx$ is greater than Vx, the timing generation unit 930 reduces Off-time of the timing signal TOFF (i.e., it can be utilized to reduce Off-time of the high side switch of the output stage, or to extend Off-time of the low side switch of the output stage).

The timing signal TOFF may be utilized to control Off-time of the switches in the output stage. When the load current is transient, the timing signal TOFF may first increase a pulse width of the pulse width modulation signal PWM in response to changes of the output voltage Vout, and timely reduces the pulse width once energy of the output voltage Vout becomes sufficient. Accordingly, the DC-DC controller may adaptively adjust the pulse width of the pulse width modulation signal PWM according to the timing signal TOFF, so as to regulate the output voltage.

Based on the content disclosed in forgoing embodiments, the error signal Err of FIG. 5A is in opposite phase of the output voltage Vout. When the ramp signal Vramp of FIG. 5A is the repeat-declining slope, the timing generation unit 630 may be utilized to calculate the timing signal TON through the preset voltage difference Vw. When the ramp signal Vramp of FIG. 5A is the repeat-inclining slope, the timing generation unit 930 may be utilized to calculate the timing signal TOFF through the preset voltage difference Vx.

In addition, the error signal Err of FIG. 5B is in same phase of the output voltage Vout. Person skilled in the art may deduce a technique for FIG. 5B based on above disclosures. That is, when the ramp signal Vramp of FIG. 5B is the repeat-inclining slope, the timing generation unit 630 may be utilized to calculate the timing signal TON through the preset voltage difference Vx. When the ramp signal Vramp of FIG. 5B is the repeat-declining slope, the timing generation unit 930 may be utilized to calculate the timing signal TOFF through the preset voltage difference Vw. Accordingly, the timing signal TON/TOFF may be calculated by the timing generation unit of the embodiments of the invention by using the voltage difference intervals $\{$Err to (Err−Vw)Delay$\}$ and $\{(Err+Vx)_{Delay}$ to Err$\}$.

Figure 11:
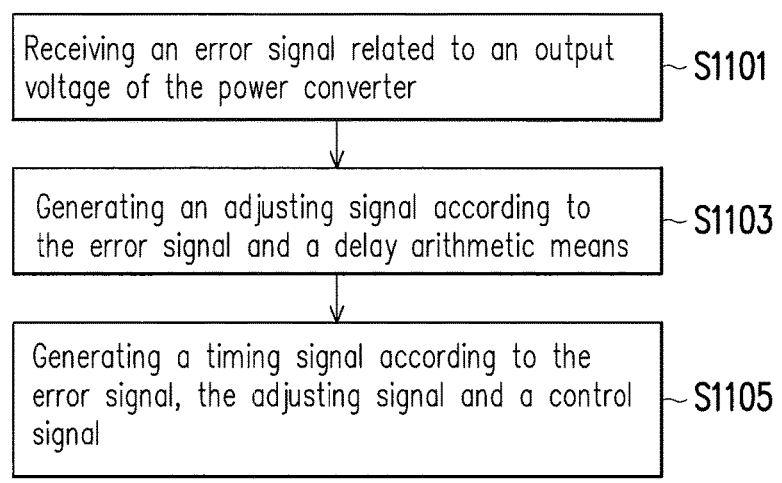
FIG. 11 is a flow chart illustrating the timing signal generation method according to an embodiment of the invention.

Moreover, based on the content disclosed in forgoing embodiments, a timing signal generation method for common power converter may also be archived. More specifically, FIG. 11 is a flow chart illustrating the timing signal generation method according to an embodiment of the invention. Referring to FIG. 11, the timing signal generation method of the present embodiment is suitable to regulate an output voltage in a DC-DC controller and including the following steps.

An error signal Err related to an output voltage Vout (as depicted in FIG. 5A) of the power converter is received (step S1101).

An adjusting signal V1 is generated according to the error signal Err and a delay means (step S1103), in which the delay means is, for example, the delay circuit 620 depicted in FIG. 6 or the delay circuit 920 depicted in FIG. 9.

Next, a timing signal TON/TOFF is generated according to the error signal Err, the adjusting signal V1 and a control signal ST (step S1105). It should be noted that, a width of the timing signal TON/TOFF may be changed with the error signal and the adjusting signal, and the control signal ST is the ramp signal Vramp related to the power converter.

In light of above, the timing generator of the invention utilizes an error signal related to an output voltage of a power converter and a delay means to generate an adjusting signal. The timing generator generates a timing signal according to the error signal, the adjusting signal and a control signal. The timing signal is utilized to adjust a width of ON-time of a high side switch in an output stage, or to adjust a width of OFF-time of a high side switch in an output stage. During a load transient period, since the timing signal provided by the timing generator may effectively converge the output voltage, the output voltage may be stabilized and duration of oscillation can be reduced, so as to solve the problem as mentioned in Description of Related Art.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

Any of the embodiments or any of the claims of the invention does not need to achieve all of the objects, advantages or features disclosed by the invention. Moreover, the abstract and the headings are merely used to aid in searches of patent files and are not intended to limit the scope of the claims of the present invention.

What is claimed is:

1. A timing generator for a power converter, the power converter including a first amplifier, a first comparator and a ramp generator, the first amplifier providing an error signal, the first comparator connected to the first amplifier and the ramp generator and receiving the error signal and a ramp signal to provide a control signal, the comparator connected between the amplifier and the timing generator, comprising:

an adjusting circuit receiving an error signal related to an output voltage of the power converter, and generating an adjusting signal according to the error signal and a delay circuit; and a timing generation unit, comprising a second comparator receiving the error signal and a second amplifier receiving the adjusting signal, coupled to the adjusting circuit and receiving the control signal, and generating a time signal according to the error signal, the adjusting signal and the control signal, wherein a width of the timing signal is changed with the error signal and the adjusting signal.

2. The timing generator of claim 1, wherein the control signal is a comparison result of a first comparator of the power converter, and the first comparator receives the error signal and a ramp signal.

3. The timing generator of claim 1, wherein the control signal is a ramp signal related to the power converter.

4. The timing generator of claim 1, wherein the delay circuit includes a resistor, a first capacitor and a first current source being coupled together at a common node, and the adjusting signal is generated at the common node.

5. The timing generator of claim 1, wherein the adjusting circuit includes a first amplifier and the delay circuit, the first amplifier having a first input terminal receiving the error signal, a second input terminal coupled to an output terminal of the first amplifier, and an output terminal coupled to the delay circuit.

6. The timing generator of claim 5, wherein the delay circuit includes a resistor, a first capacitor and a first current source, in which the resistor has a terminal coupled to an output terminal of the first amplifier and a second input terminal of the first amplifier, and another terminal coupled to a common node together with the first capacitor and the first current source, and the adjusting signal is generated at the common node.

7. The timing generator of claim 1, wherein a relation between the adjusting signal and the error signal is expressed as:

$$V1 = (Err - Vw)_{Delay},$$

wherein V1 is the adjusting signal, Err is the error signal, Vw is a preset voltage difference, and the term of Delay as a lower subscript refers to a preset time to delay the signal of (Err−Vw).

8. The timing generator of claim 1, wherein the timing generation unit includes a second comparator and a control circuit, the second comparator receiving the error signal and a first preset voltage so as to control the control circuit to generate the timing signal, wherein the first preset voltage is related to the adjusting signal.

* * * * *